United States Patent
Wallace

[15] 3,653,918
[45] Apr. 4, 1972

[54] METHOD OF PROCESSING HAMS

[72] Inventor: Charles H. Wallace, 5960 Flanders Road, Sylvania, Ohio 43560

[22] Filed: Dec. 22, 1969

[21] Appl. No.: 886,826

[52] U.S. Cl. ............................................99/107, 146/222
[51] Int. Cl. ..........................................................A22c 18/00
[58] Field of Search...................99/107, 159, 194, 254, 197, 99/198; 209/173; 146/222

[56] References Cited

UNITED STATES PATENTS

| | | | |
|---|---|---|---|
| 2,051,676 | 8/1936 | Bloedorn | 209/173 |
| 2,355,735 | 8/1944 | Kerr | 209/173 |
| 2,542,382 | 2/1951 | Vucassovich | 99/254 |
| 3,215,540 | 11/1965 | Wierbicki et al | 99/159 X |

Primary Examiner—Hyman Lord
Attorney—Allen D. Gutchess, Jr.

[57] ABSTRACT

A method and apparatus for grading or sorting hams are provided. The hams are placed in a container of brine of a predetermined density with the fatter hams tending to float and the leaner ones tending to sink. Those near the surface of the brine in the container are sold with minimum or no trimming while those near the bottom are de-boned and the fat is removed for sale at a premium price. In the particular apparatus, the hams move along a trough containing the brine which is supplied at one location and removed from another for recirculation. A conveyor at one position in the trough removes the floating hams and a conveyor at another position removes the sunken hams.

2 Claims, 7 Drawing Figures

INVENTOR.
CHARLES H. WALLACE
BY
Allen D. Gutchess, jr
ATTORNEY

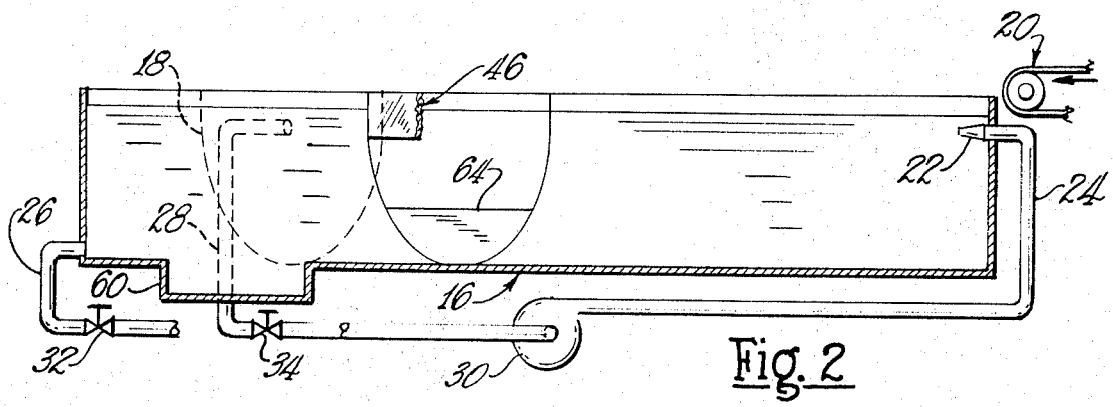
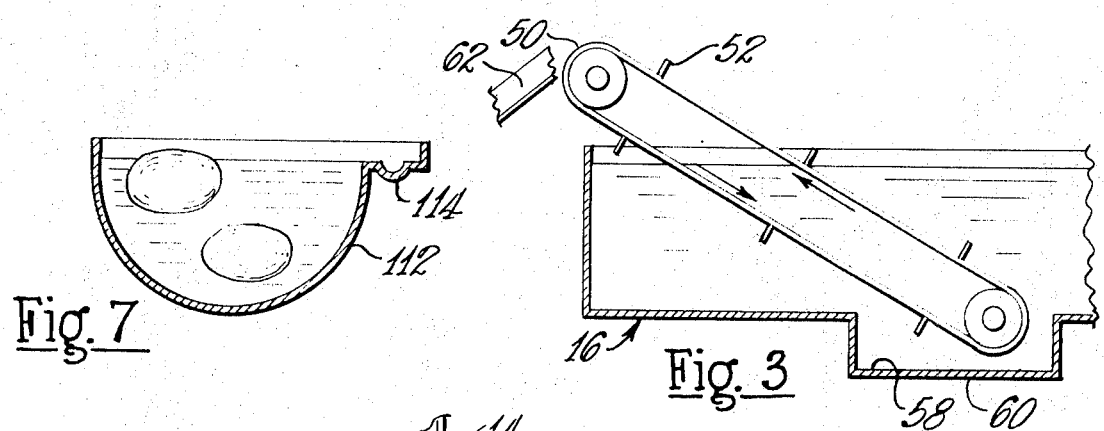
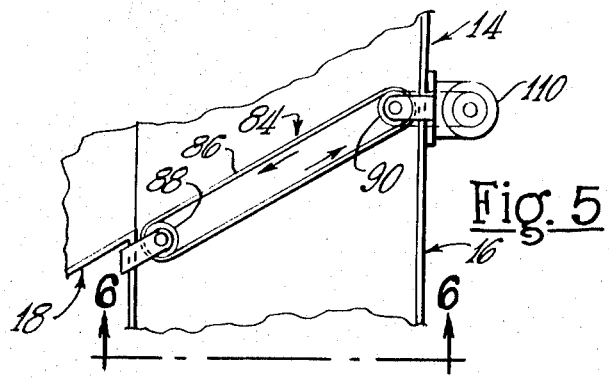
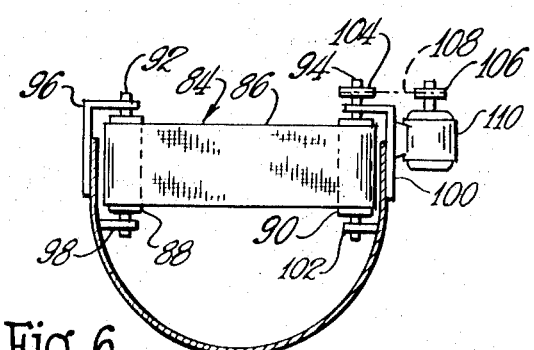
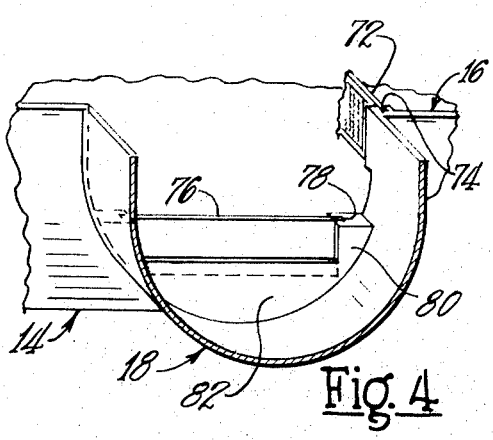

METHOD OF PROCESSING HAMS

This invention relates to a method and apparatus for grading or sorting hams or other large pieces of meat, the extent of the fat on which may vary from piece to piece.

Hams are commonly sold by packing houses either substantially as they are cut from the animal or after they are de-boned and the fat removed, and after the usual "pumping" and smokehouse processes, in either case. Economically, it is advantageous for the hams having the most fat to be sold with minimum processing and trimming, with the leaner hams being the ones which are de-boned and from which the fat is removed. However, even the most experienced meat processor cannot reliably sort or grade relatively fat and relatively lean hams by a visual inspection.

In accordance with the invention, the hams are placed in brine or a salt solution of a predetermined strength, in which the fatter hams tend to float and the leaner hams tend to sink. The former hams are then removed for packaging for sale with minimum trimming while the fat is removed from the latter hams and they usually are de-boned prior to further processing and packaging. After grading, all of the hams are pumped with brine and are subjected to a smokehouse treatment.

In a preferred form, the apparatus for grading the hams includes a container or trough for brine with branch troughs extending therefrom. Brine is supplied to one end of the trough and is withdrawn from the ends of the branch troughs and recirculated by means of a pump. The flow of brine through the main and branch troughs carries the hams therealong, whereby the brine acts as both a grading and a conveying medium. Baffles are provided in the main trough to direct the floating hams into one of the branch troughs and the sunken hams into the other branch trough. Conveyors are located at the ends of the branch troughs to remove the hams therefrom for further processing.

The sunken hams, containing the least fat, are then de-boned and the fat is removed prior to further processing and packaging. The floating hams, containing more fat, are processed with minimal or no trimming. Of course, all of the hams are subjected to the usual "pumping" and smokehouse treatments.

It is, therefore, a principal object of the invention to provide a method and apparatus for grading hams to separate and sort the fatter and leaner ones for further processing.

Many other objects and advantages of the invention will be apparent from the following detailed description of preferred embodiments thereof, reference being made to the accompanying drawings, in which:

FIG. 2 is a somewhat schematic view in longitudinal cross section taken through the container of FIG. 1;

FIG. 3 is a somewhat schematic view in vertical cross section taken through an end of a branch trough of the container of FIG. 1 and showing a conveyor in elevation;

FIG. 4 is a fragmentary view in perspective of modified baffles incorporated with the branch troughs of the container of FIG. 1;

FIG. 5 is a fragmentary plan view of the container of FIG. 1 with a further modified upper baffle;

FIG. 6 is a transverse sectional view taken along the line 6—6 of FIG. 5; and

FIG. 7 is a somewhat schematic view in transverse cross section of a modified trough.

Figure 1:
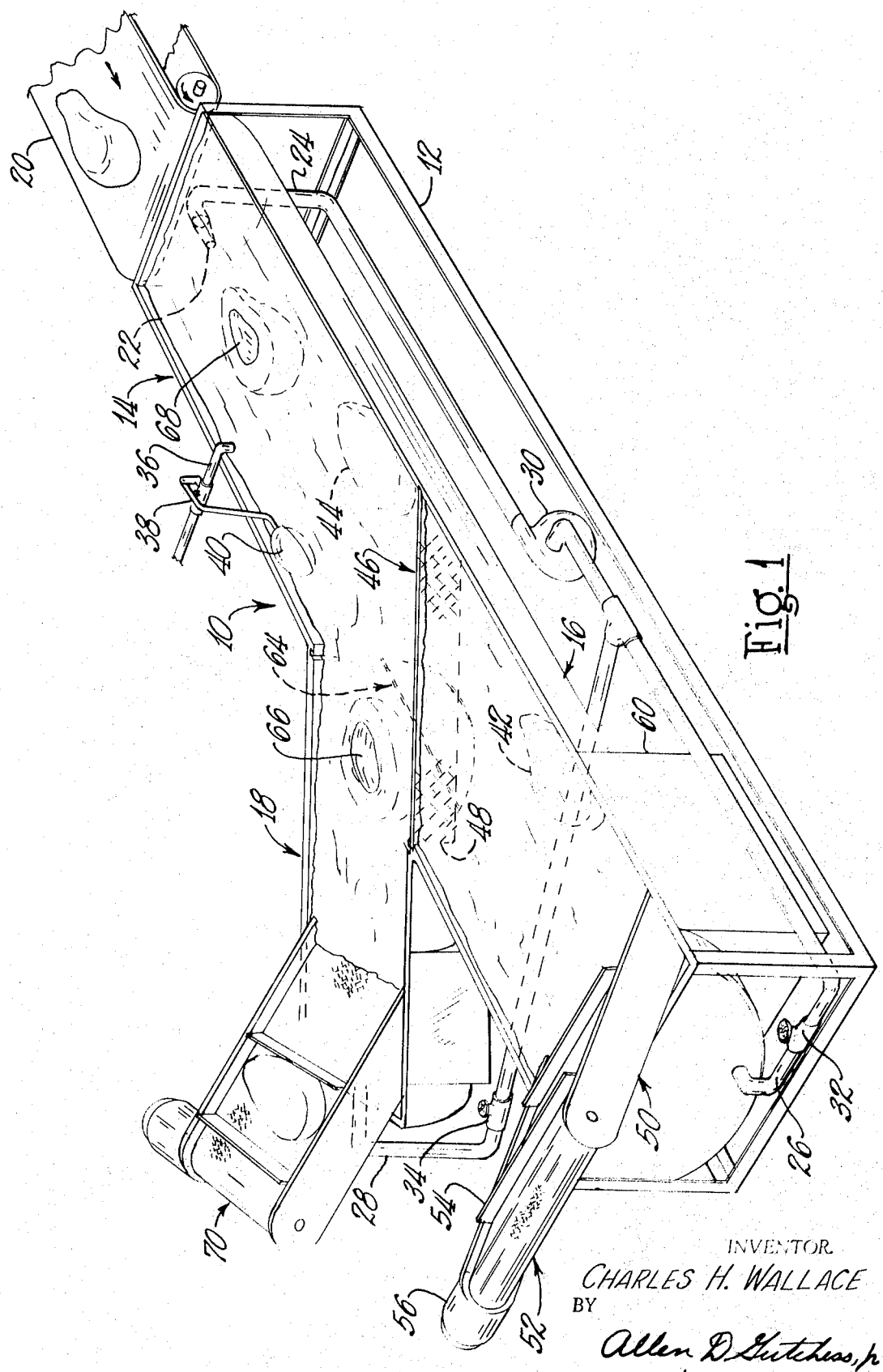
FIG. 1 is an overall, somewhat schematic view in perspective of a container according to the invention for grading or sorting hams.

FIG. 1 shows one form of preferred apparatus for carrying out the invention. Accordingly, a container or elongate receptacle indicated at 10 contains salt solution or brine having a salimeter reading of a predetermined value, from 12–30, and preferably 15–25, as measured at 38° F. A certain number of hams placed in the brine will tend to sink or be at a lower level while a certain number will tend to float or be at an upper level when left in the solution for a sufficient period. However, the hams will not either float or sink so as to be at either the top of the brine or the bottom of the container but will be generally distributed throughout the depth of the brine as they move along through the container. Whether the hams tend to sink or float depends upon their apparent density, which depends primarily upon the extent of the fat thereon. The relative number of any given group of hams which will sink or float will also depend upon the strength of the brine, with more hams tending to float in brine with a higher salimeter reading. Liquids other than brine can be employed although brine is preferred, being inexpensive, readily available, and aiding in preserving the hams.

By way of example, assume that a packing house or processor is handling 2,000 hams a day and, of these, desires to sell 500 as semi-boneless with the fat removed; 500 as boneless with the fat removed; and 1,000 with the bone in and substantially no fat removed. Under such circumstances, the brine in the container can be controlled to have a salimeter reading of 20° at 38° F. The lower 1,000 hams in the brine then serve as the 500 boneless and 500 semi-boneless hams, all with fat removed. On another day, the processor may again handle 2,000 hams but wishes to package 1,500 as boneless and with the fat removed, and 500 with the bone in and substantially no fat removed. In such an instance, he may control the strength of the brine to have a salimeter reading of 15° at 38° F. The hams will then tend to be at a lower level in the brine and the lower 1,500 of the 2,000 hams will be de-boned and the fat removed. On still another day, the processor may desire to process 2,000 hams so as to package 500 with the bone and fat removed and 1,500 with the bone in and substantially no fat removed. In that instance, the brine may be set at a salimeter reading of 25, in which instance the lower or leaner 500 hams are processed to remove the bone and fat.

In all of these instances, the leanest hams are separated for the de-boning and fat removal process while the fattest hams are packaged with minimum trimming. By enabling more efficient processing of the hams to be achieved, a savings of about 3½ cents per pound is attained. With the above figures, this savings can amount to over 1,000 dollars daily.

After the hams are graded, they are pumped full of brine and other ingredients to impart flavor and color. The fatter hams then receive minimal or no trimming and are placed in "stockings." The lean ones are de-boned and substantially all fat removed. They are then placed in cellulose casings. The hams are then given the usual smokehouse treatment, in both cases.

Referring to the particular apparatus in the drawings, the container 10 is mounted on a suitable supporting framework 12 and, in this instance, includes a main trough 14, a branch trough 16 for sunken hams, and a branch trough 18 for floating hams. Again, the terms "sunken" and "floating" are relative as used herein and indicate hams in the lower portions of the brine and in the upper portions of the brine, respectively. The hams are supplied to one end of the main trough 14 by a belt conveyor 20 which carries the raw hams from the cutting line into the container. The brine therein is supplied at the one end of the main trough 14 by a nozzle 22 and a supply line 24. The brine is recirculated from the ends of the branch troughs 16 and 18 through return lines 26 and 28 to the supply line 24 by a pump 30 located under the container. Valves 32 and 34 control the relative flow or recirculation rates of the brine from the respective troughs 16 and 18. The resulting flow of brine through the container 10 aids in moving the hams therealong so that the brine serves both to convey the hams and to grade or sort them as they reach a level therein indicative of their density and amount of fat. Some brine, of course, will be carried off on the hams so that make-up brine is provided through a line 36 having a valve 38 regulated by a level control float 40.

The branch trough 16 in this instance is essentially an extension of the main trough 14. The trough 16 receives the sunken or lower level hams, such as the two indicated at 42 and 44. These hams are carried along the main trough 14 and the branch trough 16 under an upper baffle 46 which is shown as a mesh panel 48 extending diagonally across the troughs between side walls thereof. To further aid in moving the lower level hams through the branch trough 16, the exhaust or return line 26 communicates with the end of the branch trough 16 at a lower portion thereof. When the hams 42 and 44 reach a point near the end of the trough 16, they are engaged by a suitable conveyor and removed from the container for further processing. As shown, a conveyor 50 has a mesh belt 52 carrying transverse slats 54 to remove the sunken hams, the belt being driven by a motor shown schematically at 56 at the upper end. The lower end of the belt 52 extends into a recess or pocket 58 (FIG. 3) formed by a box structure 60. The hams from the conveyor 50 are dropped onto a chute 62 from which they slide onto a processing conveyor (not shown). These hams can then be de-boned and substantially all of the fat removed to enable the hams to be sold at premium prices. Of course, all of the hams are subjected to the usual pumping and smokehouse processes, whether trimmed or not. Since the hams at the lower level are leaner, there is less fat to be removed; consequently, there is less material to be cut off and wasted or sold at minimal prices.

A lower baffle 64 is disposed parallelly to the direction of movement of the hams in the main trough 14 and is located across the entrance to the branch trough 18 where it communicates with the main trough. The lower baffle 64 directs the sunken hams, such as the hams 42 and 44, to the branch trough 16. However, floating hams or those at the upper level of the brine, such as hams 66 and 68, float over the lower baffle 64 and move into the branch trough 18 under the influence of the brine current. The return line 28 for the trough 18 is located at the upper level thereof to further influence movement of the floating hams. Most of the floating hams 66 and 68, however, will move into contact with the upper baffle 46 which is located diagonally to the path of the hams in the main trough 14 with the upper baffle then directing the floating hams into the branch trough 18.

The hams moving into the branch trough 18 are removed from the brine by a suitable conveyor 70 which is illustrated as a belt-type, similar to the conveyor 50. The hams removed on the conveyor 70 are subsequently given minimal or no trimming.

In place of, or as a supplement to, varying the strength of the brine to regulate the separation of the leaner and fatter hams according to immediate commercial needs, the upper and lower baffles can be vertically adjusted to achieve a similar effect. Accordingly, an upper baffle 72 is located in the same position as the baffle 46 but is mounted in grooves 74 at the sides of the container 10 so as to be moved up and down relative thereto to thereby vary the number of hams intercepted and directed into the trough 18. Set screws or other suitable means (not shown) can be used to hold the baffle at any given position.

A lower baffle 76 is mounted for vertical adjustment in grooves 78 of side brackets 80 with the lower edge of the movable baffle 76 overlapping an upper edge of a stationary bottom baffle 82. The baffle 76 thereby can be raised and lowered, or removed altogether, to vary the number of the sunken hams which are directed into the trough 16.

Referring to FIGS. 5 and 6, a modified upper baffle 84 is shown in place of the baffle 46 or 72. The baffle 84 includes a mesh belt 86 extending between side rollers 88 and 90 having shafts 92 and 94 rotatably mounted on side brackets 96, 98, and 100, 102. The shaft 94 is driven through pulleys 104 and 106 and a belt 108 by a motor 110. The shafts 92 and 94 preferably can be vertically adjusted in the brackets 96–102 to adjust the mesh belt 86 vertically. The belt is driven in the direction of the arrows in FIG. 5 so that hams coming in contact therewith are moved therealong into the trough 18.

In some instances, there is a tendency for foam to be produced on the brine which apparently is a reaction of the fat of the ham and certain ingredients in the brine. This is particularly true if ingredients are added to the brine to enhance the color of the hams therein. To remove the foam, a modified trough or container 112 can be used in place of the troughs 14–18. The trough 112 has a side trough 114 located approximately at the level of the brine in trough 112 so that foam thereon floats into the side trough 114 and can be removed through a suitable drain at one end of the trough.

Various modifications of the above described embodiments of the invention will be apparent to those skilled in the art and it is to be understood that such modifications can be made without departing from the scope of the invention, if they are within the spirit and the tenor of the accompanying claims.

I claim:

1. A method of processing hams which may vary in apparent density, said method comprising placing the hams in one portion of an elongated treating zone containing salt solution having a salimeter reading of 12–30 at 38° F., supplying the salt solution to said zone near one portion thereof and removing salt solution from another portion of said zone whereby said salt solution acts as a conveying medium to move said hams along said zone, removing sunken hams from the salt solution at a location spaced from said one portion of said zone, at least partially deboning and removing the fat from the latter hams, packaging the deboned and defatted hams, removing hams tending to float from the salt solution at a location spaced from said one portion of said zone, and packaging these hams without removing the bone or most of the fat therefrom.

2. A method according to claim 1 characterized further by withdrawing salt solution from said zone at a location spaced from said one portion and recirculating the withdrawn salt solution back to said zone at a location near said one portion.

* * * * *